Patented July 27, 1948

2,445,911

UNITED STATES PATENT OFFICE 2,445,911

PROCESS OF ACETYLATING TRIETHYL CITRATE

Charles H. Fisher, Abington, Pa., and Martin L. Fein, Riverside, N. J., assignors to the United States of America as represented by the Secretary of Agriculture No Drawing. Application March 21, 1946, Serial No. 656,123

1 Claim. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

The present invention relates to an improved process for acylating esters of hydroxy acids, such as alkyl lactates, and, particularly, to a process of acylating such hydroxy esters continuously. It is known that esters of hydroxy acids can be prepared by treatment with acid anhydrides, acid chlorides, and ketene. However, when accomplished by the procedures of previous investigators, the acylation of hydroxy esters has been tedious and time-consuming. Previous methods have not been simple enough that continuous operation is feasible.

We have found that the procedures used in previous investigations can be simplified in such a manner that time and materials are saved. Moreover, we have found that cooling is not necessary when the acylating agent is added to the alkyl ester of hydroxy acid. Moreover, we have found that it is not necessary or advantageous to allow the reaction mixture to stand for some time prior to distillation. The discovery that the acylation can be made to occur rapidly is of practical importance since, under these conditions, the acylation can be operated advantageously as a continuous process in industry.

Although satisfactory for the preparation of small quantities of methyl alphaacetoxypropionate in the laboratory, the methods described by previous workers have not been satisfactory for continuous operation where low contact times are desirable. Other disadvantages of previous methods will become apparent from comparing previous methods with those of the present invention.

Our invention is illustrated by, but not limited to, the following examples:

Example I

One drop of concentrated sulfuric acid was added to a mixture of 156 g. methyl lactate, 169 g. acetic anhydride (approximately 10 percent in excess of the theoretical amount), and 50 cc. of diphenyl ether. The temperature rose immediately to about 100° C. The mixture was allowed to stand for 45 minutes and then was distilled through a 12-inch Widmer column. The forerun consisted mainly of acetic acid. The desired product, methyl alphaacetoxypropionate, distilled principally at 172° to 173°. The fraction collected at 168° to 173° amounted to 211 g. (96 percent of the theoretical) and had a refractive index of 1.4091 at 20° C.

The diphenyl ether, which was used to drive over all the methyl acetoxypropionate, remained in the distilling flask. It was used in subsequent preparations of methyl acetoxypropionate.

Example II

Methyl lactate (156 g.), 169 g. acetic anhydride, and 40 cc. diphenyl-ether were mixed and distilled immediately through a 12-inch Widmer column. Acetic acid and 211 g. (96 percent of the theoretical yield) of methyl alpha-acetoxypropionate were obtained. Refractive index of the product at 20° C. was 1.4089.

Example III

A mixture of 169 g. acetic anhydride and 1 drop of concentrated sulfuric acid was added gradually from a separatory funnel to 156 g. of methyl lactate. During the addition, the reaction temperature rose to 96° C. Diphenyl ether (50 cc.) was added, and the mixture was distilled in vacuum. The yield of methyl alpha-acetoxypropionate boiling at 76° C. under 20 mm. of mercury pressure was 96.4 percent of the theoretical.

Example IV

When a mixture of 114 g. of ethyl lactate and 102 g. of acetic anhydride was distilled, acetic acid and 154.6 g. (96.6 percent of the theoretical yield) of ethyl alpha-acetoxypropionate was obtained. Most of the ethyl alpha-acetoxypropionate distilled at 182° C.; the specific gravity at 20° C. was 1.4083.

Example V

Methyl lactate (832 g. or 8 moles) was added from a separatory funnel to a mixture of 857 g. (8.4 moles) of acetic anhydride and 0.9 g. concentrated sulfuric acid contained in a flask provided with a mechanical stirrer; the flask was immersed in a water bath. During the addition of methyl lactate, the reaction temperature was kept at approximately 60° C. by addition of suitable amounts of ice to the water bath. Distillation of the reaction mixture yielded 1109.5 g. (94.9 percent of the theoretical) of methyl alpha-acetoxypropionate, most of which distilled at 63° to 64° C. under 10 mm. of mercury pressure.

Example VI

One ml. of acetyl chloride was added to a mixture of one mole of methyl lactate (104 g.) and one mole of acetic anhydride (102 g.). The temperature rose from that of the room to 102° C. in 2.5 minutes. Diphenyl ether was added, and the mixture was distilled at atmospheric pressure. The yield of methyl alpha-acetoxypropionate was 94 percent of the theoretical.

Example VII

A mixture of 2 moles (208 g.) of methyl lactate and 2 moles (204 g.) of acetic anhydride was passed through a preheater at a controlled rate and into continuous distillation apparatus. The apparatus was arranged for accurate temperature control of the preheater, column sections, and still pot. The material to be distilled, after being passed through the preheater, was allowed to enter at a point approximately two-fifths of the total length from the bottom of the column. The lower portion of the column and still pot were kept at temperature near the boiling point (172° C.) of methyl alpha-acetoxypropionate. The upper portion of the column and still-head were controlled in such a manner that acetic acid distilled over. The desired product, methyl alpha-acetoxypropionate, was removed from the small still pot through a side arm and appropriate siphoning arrangement. Purity of the product was checked by index of refraction at fixed intervals. The overall height of the column used was approximately 6 feet, the preheater capacity was about 20 ml., the column diameter was approximately ⅞ inch, the upper column was packed with small Berl saddles, and the lower column had Vigreux-type indentations. The still pot capacity was 100 ml. (This equipment is described also in Industrial and Engineering Chemistry, vol. 36, March 1944, pp. 235–238.)

Under proper adjustment of rate of addition of material through the preheater and temperature control of the column, material of high purity can be made continuously with high conversions.

Material of high purity can be made in high yields at both faster or slower feed rates, as well as at higher or lower preheater temperatures, than those indicated below:

| Feed rate | Preheater temperature | Contact time in preheater |
|---|---|---|
| Cc./min. | °C. | Min. |
| 6 | 135 | 3.3 |
| 4 | 118 | 5.0 |
| 8 | 118 | 2.5 |

Example VIII

A mixture of 2 moles (236 g.) of ethyl lactate and 2 moles (204 g.) of acetic anhydride were reacted continuously in a manner similar to that described in Example VII. Slight changes in operating temperature of the distillation column were necessary because of the higher boiling point (177° to 179° C.) of ethyl alpha-acetoxypropionate. Results similar to those described under Example VII were obtained with approximately the same operating conditions used in Example VII.

Example IX

A mixture, in molecular proportion, of isobutyl glycolate (isobutyl hydroxyacetate) and propionic anhydride was treated in essentially the same manner as described under Example VIII. Minor changes in temperature control were required due to different boiling points of materials to be reacted and separated. The only change in apparatus was the replacement of the Vigreux section of the distillation column by a section packed with Berl saddles (¼ inch). The products removed continuously from the apparatus were propionic acid (distillate) and isobutyl acetoxyacetate (from the still pot). Redistilled isobutyl acetoxyacetate: (B. P.=96° C./8 mm. (mercury), 80.5° C./3.2 mm. (mercury); $N_D^{20}$=1.4193.)

| | |
|---|---|
| Still-head temperature °C | 139–141 |
| Upper column temperature °C | 140–143 |
| Lower column temperature °C | 198–206 |
| Still-pot temperature °C | 218–224 |
| Preheater temperature °C | 123–126 |
| Feed rate into preheater cc./minute | Approx. 6 |

Example X

Acetic anhydride containing a small amount of concentrated sulfuric acid (several drops per mole) was fed into a mixing chamber simultaneously with methyl alpha-hydroxyisobutyrate. Prior to passage by gravity into the mixing chamber, each was stored in a 1000 ml. burette. The two burettes and the mixing chamber were under the same pressure, this pressure being used to transfer the material from the mixing chamber through the preheater into the distillation unit. With proper manipulation of stop-cocks and pinch-clamps, it was possible to replenish continuously the burettes with the reactants and also feed the reactor and still continuously. Acetic anhydride and methyl alpha-hydroxyisobutyrate were reacted in essentially molecular proportions. The apparatus was the same as described under Example IX except for the addition of the burettes for simultaneous introduction of reactants. The operation of the apparatus was the same as described under Example VIII, the only changes being described above.

| | |
|---|---|
| Feed rate into preheater cc./minute | 10 |
| Still-head temperature °C | 115 |
| Still-pot temperature °C | 160–170 |
| Preheater temperature °C | 89–115 |

The products were: methyl alpha-acetoxyisobutyrate (B. P. 170.5 (atm.), $N_D^{20}$, 1.4137) withdrawn from the still-pot and acetic acid distilled from the column.

Example XI

Castor oil (glyceryl triricinoleate) was reacted continuously with acetic anhydride and the products continuously separated, using the procedure and apparatus described under Example X.

| | |
|---|---|
| Feed rate into preheater cc./minute | Approx. 17 |
| Still-pot temperature °C | 230–240 |
| Distillate temperature °C | 117 |
| Preheater temperature °C | 100–120 |

Example XII

Triethyl citrate was reacted continuously with acetic anhydride and the products continuously separated, using the procedure and apparatus described under Example X. Acetylated triethylcitrate removed from the still-pot was passed through the preheater and column again to insure removal of all low-boiling material. Virtually no lower boiling material distilled during the recycling process.

| | |
|---|---|
| Feed rate into preheater cc./minute | 20 |
| Still-pot temperature °C | 210–235 |
| Distillate temperature °C | 117 |
| Preheater temperature °C | 100 |

Although our invention is specifically illustrated by the above examples, it is understood that it is not limited to the particular materials or procedures disclosed. The general applicability of our invention to the production of esters of hydroxy acids will readily be seen by those skilled in the art. The above processes are applied to esters of other hydroxy acids, such as malic acid and tartaric acid.

It will be apparent to those skilled in the art that various modifications of procedure may be employed without departing from the scope of our invention. For example, the reactants may be passed directly into a continuous still without first being passed through a preheater. Moreover, another liquid, such as benzene and toluene, may be used with the reactants to facilitate distillation of the carboxylic acid. Bases such as pyridine or various acids may be added with the reagents because of their catalytic action. Smaller or larger proportions of the acid anhydride may be used. The time of preheating can be lengthened and the temperature raised without adverse effects. Sub- or super-atmospheric pressures may be used. Lower pressures are particularly useful when anhydrides of higher acids are used. The acylation can be carried out continuously, the products stored, and distilled later if desired. The acylation may be carried out continuously, and the resulting material used without distillation in subsequent operation, such as pyrolysis, if desired. If desired, an alkaline catalyst can be used in one operation, an acid catalyst in another, and the products from the two operations can be mixed for the catalysts to neutralize each other before the mixed products are distilled. If desired, the acylation can be carried out continuously with a catalyst and the catalyst continuously neutralized prior to distillation.

Having thus described our invention, we claim:

A process of acetylating tri-ethyl citrate comprising reacting said citrate with acetic anhydride by continuously introducing said citrate and said anhydride into a continuous still, the lower portion of which still is at a temperature of 210° to 235° C., continuously distilling the reaction mixture of said ester and anhydride, maintaining the upper part of the still at such temperature that acetic acid distills off, the acetylated citric acid ester collecting in the still.

CHARLES H. FISHER.
MARTIN L. FEIN.

REFERENCES CITED

The following references are of record in the file of this patent:

UNITED STATES PATENTS

| Number | Name | Date |
| --- | --- | --- |
| 2,367,798 | Rehberg et al. | Jan. 23, 1945 |
| 2,374,428 | Fisher et al. | Apr. 24, 1945 |

OTHER REFERENCES

Fein et al., "Ind. & Eng. Chem." vol. 36 (1944) pp. 235–238.